United States Patent [11] 3,562,591

[72] Inventor James L. Schmidt
Red Bank, N.J.
[21] Appl. No. 781,459
[22] Filed Dec. 5, 1968
[45] Patented Feb. 9, 1971
[73] Assignee Electronic Associates Inc.
Long Branch, N.J.
a corporation of new Jersey

[54] PACKAGING OF MICROLOGIC ELEMENTS
3 Claims, 1 Drawing Fig.

[52] U.S. Cl. .......... 317/101, 339/221, 339/198, 339/17
[51] Int. Cl. .......... H05k 1/04
[50] Field of Search .......... 339/176 (MP), 17C, 221(M); 339/214, 198.3; 317/101(CC) 101(OH); 29/626, 630(D), 593; 179/88, 52.6; 317/101CC, 101

[56] References Cited

UNITED STATES PATENTS

| | | | |
|---|---|---|---|
| 2,408,843 | 10/1946 | Gauthier | 339/214X |
| 3,233,034 | 2/1966 | Grabbe | 339/221M(UX) |
| 3,328,749 | 6/1967 | Kukla | 339/221 |
| 3,461,552 | 8/1969 | Wolf et al. | 29/593X |

FOREIGN PATENTS

| | | | |
|---|---|---|---|
| 974,133 | 11/1964 | Great Britain | 339/176NIP(UX) |

*Primary Examiner*—David Smith, Jr.
*Attorneys*—Edward A. Petko and Robert M. Skolnik

ABSTRACT: An apparatus for packaging micrologic components having "chair" shaped pins which reduce the space required for a two wire wrap connection from two levels to one while providing easily changeable component mounting.

PATENTED FEB 9 1971 3,562,591
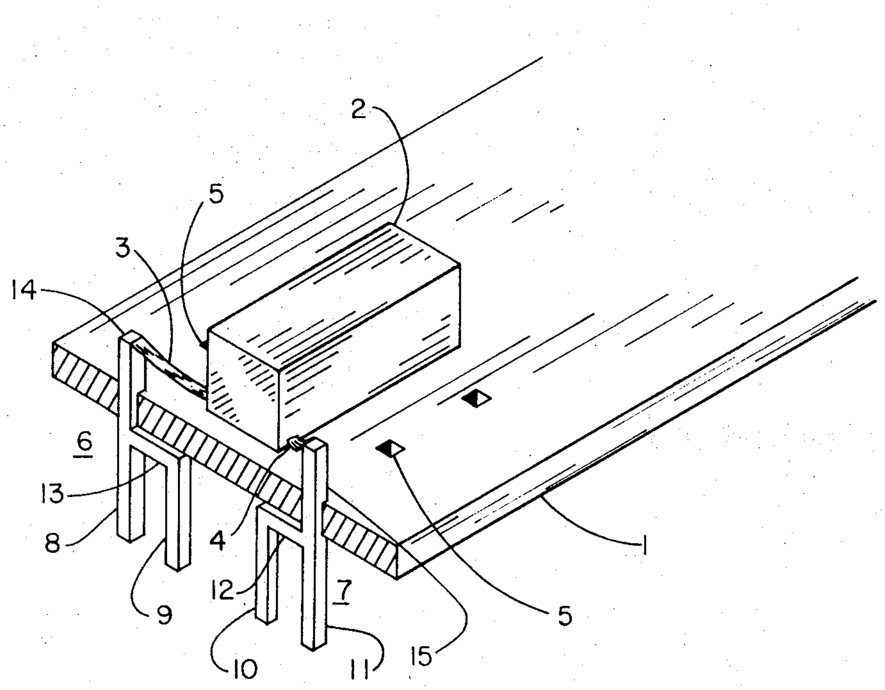
INVENTOR.
JAMES L. SCHMIDT
BY

PACKAGING OF MICROLOGIC ELEMENTS

This invention relates to the packaging of micrologic components, and more particularly to a packaging technique having high circuit density and very low interference between components.

Today, packaging techniques for a computer are a function of the type of logic to be employed therein. In the past, packaging has, for the most part, been limited to the use of double-sided printed circuit cards with the electrical characteristics of the interconnection system on the card being generally ignored and the design of the card delegated to the skills of a draftsman. The techniques of the past are no longer appropriate due to the development of extremely g high speed integrated circuits of the type shown as CML (current mode logic), or ECL (emitter coupled logic).

These integrated circuits have delays averaging 5 nsec and rise times of 4—6 nsec with four to six outputs connected to the integrated circuit As used herein, the term "delay" refers to the time required for a signal to propagate from input to output in a single integrated circuit; and "rise time" refers to the time required to switch from steady state logic 0 to steady state logic 1. Where the need for speed is critical, logic having a delay of 2 nsec is employed.

With such delays and rise times, a short length of interconnection wire now becomes a transmission line with requirements for correct termination and loading, and the need for protection from signal cross coupling. In addition, logic networks of about 6 inches in length become L-C ringing networks if they are not carefully designed and wired. Use of logic having delays in the 5 nsec area greatly increases the packaging design complexity and cost.

In addition to the introduction of errors because of fast logic speeds, the prior printed circuit board packaging resulted in problems when engineering changes in the circuit were required. A change in circuitry required extensive effort on each circuit board in terms of removing and reforming the interconnecting conductive paths.

The present invention provides a low cost packaging system for use with state of the art logic circuits having the features of high packing density, and easy removeability for changes.

The invention includes a plurality of "chair" shaped pins extending through a suitably apertured insulating board having apertures placed every .1 inch along the component side. The "chair" pins have two portions for wire wrapping and a single portion extending through the board for supporting and making electrical connection to a micrologic element.

It is an object of the present invention to provide a packaging system for micrologic components characterized by low cost and high packing density.

Another object of the invention is the provision of a packaging system for electronic components in which changes in circuit components and configuration can be easily accomplished.

These as well as further objects and advantages of the invention will become apparent to those skilled in the art from the following detailed specification reference being made to the accompanying drawing in which:

The single FIGURE is an isometric view of a integrated circuit assembly mounted in accordance with the invention.

In the drawing, numeral 1 denotes an insulating board of the type usually employed in the manufacture of printed circuits. Board 1 has a plurality of holes 5 drilled therein of such a configuration and size that portions 14 and 15 of "chair" pins 6 and 7 may be anchored therein by frictional engagement.

Pins 6 and 7 are configured as the letter "*h*" or as a "chair" and have two wire wrap portions 8—9 and 10—11, respectively located on one side of the board called the wire wrap side, and component mounting and contacting portions 14—15 located on the opposite side of the board (the component side). Each of the pins has connecting portions 12 and 13 mounted in contact with the wire wrap side of board 1.

Numeral 2 denotes an integrated circuit logic component known as a dual in line integrated circuit. This configuration is characterized by equal numbers of contact pins located along opposite sides of a rectangular shaped body. Two of the contact pins are shown in the FIG. at 3 and 4. The integrated circuit is mounted upside-down so that the flared contact pins are spring loaded by portions 14 and 15 of the "chair" pins. It will be understood that there are as many pins 6 and 7 as are needed for the number of contacts on integrated circuit 2. The contacts 3 and 4 are then soldered to the portions 14 and 15 ensuring both secure mounting and good electrical contact.

High packaging density is facilitated by pin portions 8—9 and 10—11 which reduce the length requirement for a two wrap tail to one level while maintaining the capability of two connections for each output of the integrated circuit. A further advantage of this configuration lies in the ability to remove any wire without the need to unwrap any other. In addition, all wires are maintained close to the ground plane of the insulating board resulting in more uniform transmission line characteristics.

Interconnection between mounting boards is accomplished by the use of suitable electrical connections mounted therein and wired to the appropriate wire wrap terminals of the "chair" pins.

I claim:

1. In combination:

a board having two sides and a plurality of spaced apertures extending therethrough; and a plurality of electronic component mounting and interconnection means each having a first elongated portion, a second elongated portion extending perpendicularly from said first portion, and a third elongated portion extending from an end of said second portion parallel to said first portion;

said means being mounted in said apertures so that said second portion is located on either of said sides and at least one of said first and third portions extend through said apertures whereby said portions provide both mounting and support for an electrical component and interconnection points between components.

2. The combination of claim 1 further including dual in line integrated circuit means having a plurality of contact portions, said contact portions being mounted on said board by engagement with said extended through portions.

3. A system for packaging micrologic current components comprising:

a two sided mounting board having a plurality of apertures arranged in a predetermined configuration therein;

a plurality of electronic component mounting and interconnection means each having a first elongated portion, at least one second elongated portion extending perpendicularly from said first portion, and at least one third elongated portion extending from an end of said second portion parallel to said first portion;

said means being located in said mounting board such that said second portion is located on either of said sides and at least one of said first and third portions extend through said apertures; and an electrical component having contact members mounted on said extended through portions, the remaining portions providing wire wrap connection means for said component.